(12) United States Patent
Latorre et al.

(10) Patent No.: US 7,478,198 B2
(45) Date of Patent: Jan. 13, 2009

(54) MULTITHREADED CLUSTERED MICROARCHITECTURE WITH DYNAMIC BACK-END ASSIGNMENT

(75) Inventors: Fernando Latorre, Huesca (ES); Jose Gonzalez, Terrassa (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 10/851,246

(22) Filed: May 24, 2004

(65) Prior Publication Data

US 2005/0262270 A1 Nov. 24, 2005

(51) Int. Cl.
G06F 12/00 (2006.01)
G06F 13/00 (2006.01)
G06F 3/00 (2006.01)

(52) U.S. Cl. .................. 711/125; 711/100; 711/154
(58) Field of Classification Search .......... 712/1, 712/12, 24, 217, 28; 711/100, 112, 113, 711/147, 148, 149, 150, 151, 152, 153; 710/1
See application file for complete search history.

(56) References Cited

U.S. PATENT DOCUMENTS 6,615,338 B1 * 9/2003 Tremblay et al. ............ 712/24
7,035,998 B1 * 4/2006 Nemirovsky et al. ........ 712/215

OTHER PUBLICATIONS

Balasubramonian et al., Dynamically Managing the Communication-Parallellelism Trade-Off in Future Clustered Processors, International Symposiumon on Computer Architecture, Jun. 2003.*
J.M. Borkenhagen, et al.; A Multithreaded PowerPC Processor for Commercial Servers, vol. 44, No. 6, p. 885 (2000), Advanced Microprocessor Design.

* cited by examiner

*Primary Examiner*—Tuan V. Thai
(74) *Attorney, Agent, or Firm*—Kenyon & Kenyon LLP (57) ABSTRACT

A multithreaded clustered microarchitecture with dynamic back-end assignment is presented. A processing system may include a plurality of instruction caches and front-end units each to process an individual thread from a corresponding one of the instruction caches, a plurality of back-end units, and an interconnect network to couple the front-end and back-end units. A method may include measuring a performance metric of a back-end unit, comparing the measurement to a first value, and reassigning, or not, the back-end unit according to the comparison. Computer systems according to embodiments of the invention may include: a random access memory; a system bus; and a processor having a plurality of instruction caches, a plurality of front-end units each to process an individual thread from a corresponding one of the instruction caches; a plurality of back-end units; and an interconnect network coupled to the plurality of front-end units and the plurality of back-end units.

47 Claims, 4 Drawing Sheets

MULTITHREADED CLUSTERED MICROARCHITECTURE WITH DYNAMIC BACK-END ASSIGNMENT

BACKGROUND

1. Technical Field

Embodiments of the present invention generally relate to computers. More particularly, embodiments relate to multithreaded clustered microarchitectures having dynamic back-end assignment schemes.

2. Discussion

Multithreaded architectures and clustering are two paradigms for forthcoming microprocessors. Multithreaded architectures can process multiple threads in parallel and thus increase throughput. Clustering allows processors to be divided into simpler components while also reducing local wire delays to meet increasing microprocessor frequency demands. The concepts of multithreading and clustering may be separately known in microprocessors such as, for example, an Intel® Pentium® 4 Xeon™ processor and an Alpha 21264, respectively. While at least one processor may implement both multithreading and clustering, see, for example, Borkenhagen et al., *A Multithreaded PowerPC Processor for Commercial Servers*, IBM Journal of Research and Development, vol. 44, no. 6, p. 885 (2000), a combination of at least a multithreaded clustered microarchitecture including a dynamic back-end assignment scheme is not known in the art.

It should be noted that as used herein, the term "multi-threaded" is used to refer to any organization that can process multiple threads, including but not limited to, multicore architectures. It should also be noted that as used herein, a "thread" is a part of a computer program that can execute independently of other parts of the computer program.

BRIEF DESCRIPTION OF THE DRAWINGS

The various advantages of embodiments of the present invention will become apparent to one skilled in the art by reading the following specification and appended claims, and by referencing the following drawings.

DETAILED DESCRIPTION

Figure 1:
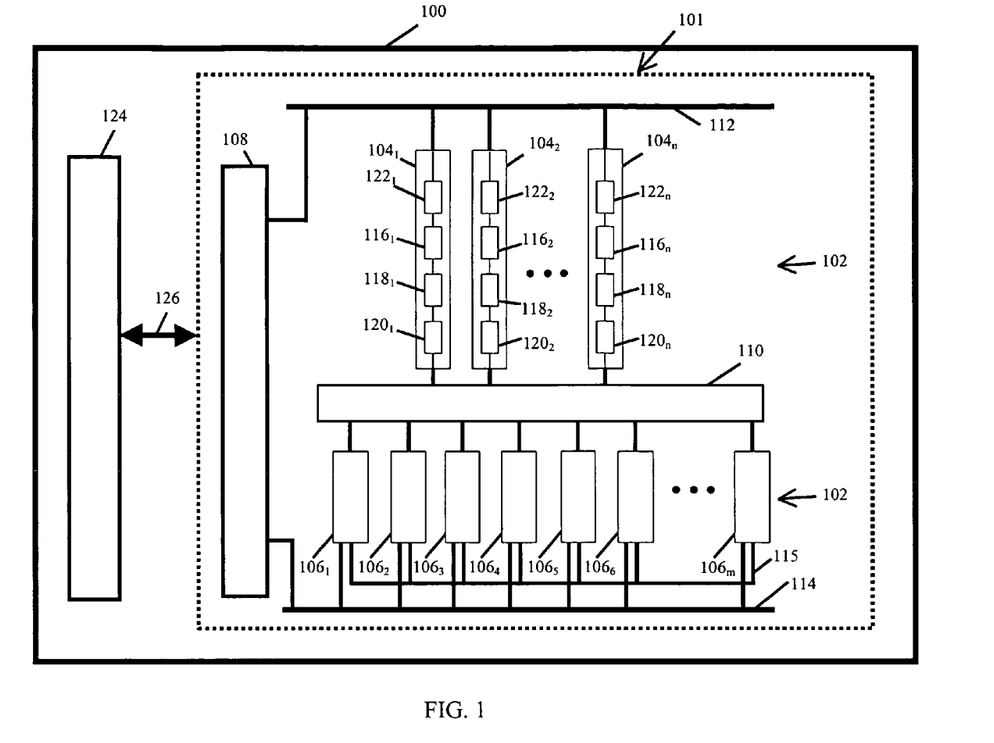
FIG. 1 is an illustrative schematic representation of a microprocessor including a clustered multithreaded microarchitecture including dynamic allocation of clusters in accordance with an embodiment of the invention.

In one embodiment of the invention, the inherent complexity of a conventional simultaneous multithreaded processor with a monolithic front-end, such as, for example, the Intel® Pentium® 4 Xeon™ processor, may be reduced by clustering (i.e., partitioning) front-end logic. The known processor may be one that is able to execute multiple threads concurrently where those threads share a front-end of the processor. Instead of implementing a single fetch/dispatch unit capable of dealing with multiple threads simultaneously, an embodiment of the invention implements a cluster of front-end units 104, where each individual front-end unit may be dynamically assigned to fetch instructions from a single thread. It should be noted that a front-end of a conventional simultaneous multithreaded processor may be that unit designated to fetch instructions from a cache, decode instructions, predict branches, rename registers, and do other actions that are typically performed before execution of an instruction.

FIG. 1 is an illustrative schematic representation of a microprocessor 100 including a clustered multithreaded microarchitecture 101 including dynamic allocation of clusters 102 in accordance with an embodiment of the invention. In one embodiment, the clustered multithreaded microarchitecture 101 comprises a plurality clusters 102. The plurality of clusters 102 may be comprised of a plurality of front-end units $104_1, 104_2, \ldots, 104_n$ and a plurality of back-end units $106_1, 106_2, 106_3, 106_4, 106_5, 106_6, \ldots, 106_m$. The clusters 102 may be coupled a memory cache 108. In one embodiment, the memory cache 108 may be a second cache memory level. An interconnection network 110 may couple the front-end units 104 to the back-end units 106. A first bus 112 may couple front-end units 104 to the memory cache 108. A second bus 114 may couple back-end units 106 to the memory cache 108. Back-end units 106 may communicate among themselves via an interconnection network, which may be, in one embodiment, a point-to-point network 115, which may be an orthogonal link that is independent of all other interconnections. Of course, other networks may be used to communicate between back-end units 106. Both the first bus 112 and second bus 114 may be used to transfer information (e.g., instructions over the first bus 112 and data over the second bus 114) that may be stored in various cache memories.) In one embodiment, the first bus 112 and the second bus 114 may only be used to transfer information; register values are not transferred over these busses 112, 114. In one embodiment, the point-to-point network 115 may be used to transfer register values among the back-end units 106. While one embodiment uses first and second point-to-point networks that are orthogonal and independent of each other, other topologies of networks may be implemented to allow communication of register values among pluralities of units without departing from the scope of the invention.

In accordance with an embodiment of the invention, each front-end unit 104 may be capable of, at least, fetching instructions from independent threads. In one embodiment, each front-end unit 104 may fetch several instructions from one of a plurality of independent threads (not shown). Instructions fetched by any of the plurality of front-end units 104 may be executed in any of the back-end units 106. As explained below, dynamic reassignment of one or more back-end units 106 to one front-end unit 104 may occur.

Each of the plurality of front-end units 104 may include the same logic, although, those of skill in the art will understand that different logic may be implemented in subsets of the plurality of front-end units 104, without departing from the scope of the invention. In one embodiment, each of the plurality of front-end units may include at least three stages. These at least three stages may include logic to at least: fetch $116_1, 116_2, \ldots, 116_n$, decode $118_1, 118_2, \ldots, 118_n$, and dispatch $120_1, 120_2, \ldots, 120_n$ instructions. Additionally, in one embodiment, each of the plurality of front-end units may include an instruction cache $122_1, 122_2, \ldots, 122_n$. In other words, there may be as many instruction caches $122_1, 122_2, \ldots, 122_n$ as front-ends 104. Accordingly, there may be as many instruction caches $122_1$, $122_2$, ..., $122_n$ as threads that are to be executed concurrently. In one embodiment, each instruction cache $122_1$, $122_2$, ..., $122_n$ may include one port from which instructions are read. Alternatively (not shown), there could be one instruction cache with as many ports as there are threads that can be executed concurrently. As known to those of skill in the art, an instruction cache is a cache that stores instructions. Alternatively (not shown), there could be one instruction cache that is divided into physical or logical units, each unit assigned to an individual one of the plurality of front-end units 104.

In one embodiment of the invention, each of the plurality of clusters 102 may be simple enough to keep communication within each back-end unit 106 fast. This simplicity of clusters 102 may result in a benefit of a reduction of communications between back-end units 106. Each front-end unit 104 may dispatch its instructions to any of the back-end units 106 to which it had been assigned. Moreover, the assignment of back-end units 106 to front-end units 104 may change dynamically.

In one embodiment, a functional sub-component of the microprocessor 100 may dynamically assign back-end units 106 (also known as "execution cores") to front-end units 104. Dynamic assignment may improve performance, may minimize interaction among the plurality of front-end units 104, and/or may simplify microprocessor design. Of course, the preceding listing is exemplary and is not intended to be a limitation on the invention disclosed herein. In one embodiment of the invention, the functional sub-component of the microprocessor 100, for example assignment engine 124, may dynamically select one or more back-end units 106 to which a particular front-end unit 104 may send its instructions. This dynamic assignment may provide a scheme to dynamically maximize performance among concurrently running threads. Communications of assignment data between the assignment engine 124 and the clustered multithreaded microarchitecture 101 may be via a data bus 126. Data bus 126 may be a dedicated bus or a shared bus without departing from the scope of the invention. Of course, other mechanisms to communicate may be used without departing from the scope of the invention. Other physical or functional structures may direct assignment of back-end units 106, without departing from the scope of the invention disclosed herein.

It should be noted that as used herein, the subscripts "n" and "m" may represent any integer value greater than or equal to 2. In the clustered multithreaded microarchitecture 101 disclosed herein, n and m may be equal or not equal in value. Furthermore, it may be preferable that n be less than or equal to m. In one embodiment n is less than m, for example, n=4 and m=8. Additionally, as used herein, front-end units $104_1$, $104_2$, ..., $104_n$ and back-end units $106_1$, $106_2$, $106_3$, $106_4$, $106_5$, $106_6$, ..., $106_m$ may be referred to collectively as "clusters 102." Moreover, as used herein, front-end units $104_1$, $104_2$, ..., $104_n$ (or any subset thereof) and back-end units $106_1$, $106_2$, $106_3$, $106_4$, $106_5$, $106_6$, ..., $106_m$ (or any subset thereof) may be referred to to individually, as "front-end unit(s) 104" and "back-end unit(s) 106," respectively. Furthermore, as used herein, the words allocation and assignment and the words re-allocation and reassignment may be used interchangeably.

The clustered multithreaded microarchitecture 101 in accordance with an embodiment of the invention disclosed herein is scalable by increasing or decreasing the number, n, of front-end units 104 and/or the number, m, of back-end units 106. In accordance with an embodiment of the invention, each front-end unit 104 operates on one thread. In one embodiment, the number of front-end units is four; that is, four threads may be operated upon in parallel. By increasing the number of front-end units 104, more threads are able to run in parallel. By increasing the number of back-end units 106, more instructions can be executed in parallel.

If the interconnection network 110 used in an embodiment of the clustered multithreaded microarchitecture 101 is, for example, a crossbar circuit, then its complexity may be increased by increasing the number of front-end units 104 and/or back-end units 106. Details of design of crossbar circuits, used as interconnects between pluralities of units, are known to those of skill in the art and do not form a part of the invention disclosed herein. Alternative, simpler interconnection networks or circuits that may be used between pluralities of networks may also be available. Examples of alternatives to the crossbar circuit may include pipelined networks and busses. The preceding list is meant to be illustrative and not exclusive.

In one embodiment of the invention, each back-end unit 106 is assigned to at most one front-end unit 104 at any moment. Each of the plurality of back-end units 106 has all the resources necessary to execute instructions. An assignment of each back-end unit 106 to at most one front-end unit 104 at any moment may provide a benefit of simplification of front-end design when compared, at least, to clustered microarchitectures where each back-end unit can execute different threads concurrently (referred to hereinafter as the "execution of different threads concurrently scheme"). The execution of different threads concurrently scheme may require a more complex design of at least some units of the front-end. In particular, in the execution of different threads concurrently scheme, rename stages must be synchronized in order to keep different free physical register lists coherent. Otherwise, errors resulting from at least one unit's improper writing of data to registers already occupied with valid data may occur. Furthermore, in the execution of different threads concurrently scheme, a mechanism to handle inter-thread collisions in the use of the dispatch ports and the entries associated to each scheduler may be needed. In contrast, in an embodiment of the invention disclosed herein, when considering front-end units 104, rename stages need not be synchronized, free physical register lists need not be kept coherent, a mechanism to handle inter-thread collisions in the use of dispatch ports and a mechanism to handle the entries associated with each scheduler need not be provided.

By way of example, in an execution of different threads concurrently scheme, if a plurality of front-end unit could steer instructions to a first back-end unit, then each of the plurality of front-end units must have information concerning which resources internal to the first back-end unit each of the plurality of front-end units is using in order to avoid conflicts. Otherwise, two different instructions that come from different ones of the plurality of front-end units could, for example, allocate a single physical register or a single scheduler slot. Thus, in the execution of different threads concurrently scheme, each of the plurality of front-end units may be synchronized in order to identify which resources the remainder of the plurality of front-end units are using in a shared back-end. By contrast, in an embodiment disclosed herein, each front-end unit 104 may be steering instructions to back-end units 106 that are different than the back-end units 106 that any other front-end unit 104 is able to use. Therefore, it may not happen that two instructions coming from different front-end units 104 allocate the same physical register (or scheduler slot, or dispatch bandwidth) because instructions from different front-end units 104 will be steered to different back-end units 106. Thus, in an embodiment in accordance with the invention described herein, resource conflicts may not occur and accordingly, synchronization is not required. Finally, in accordance with an embodiment of the invention, in the event of a back-end unit 106 reassignment, the reassigned back-end unit 106 (e.g., $106_5$) preferably cannot be used by a destination front-end unit 104 (e.g., $104_3$) until the reassigned back-end unit 106 (e.g., $106_5$) is totally empty (i.e., live registers are transferred and instructions inside the back-end are committed). Thus, when the destination front-end unit 104 (e.g., $104_3$) begins steering instructions to this reassigned back-end unit 106 (e.g., $106_5$), none of the resources of the reassigned back-end unit 106 (e.g., $106_5$) are being utilized by a previous front-end unit 104 (e.g., $104_2$). Therefore, in an embodiment in accordance with the invention, synchronization to avoid resource conflicts may not be necessary.

In an embodiment of the invention, the number of back-end units 106 assigned to any front-end unit (e.g., $104_1$, $104_2$, ..., $104_n$) may dynamically vary according to hardware requirements necessitated by, for example, the number of instructions that can be executed in parallel (a.k.a., instruction level parallelism). In an embodiment of the invention, the activity of each thread may be monitored on demand and/or at fixed or dynamically set intervals of time. Furthermore, a processor reconfiguration may be triggered depending on the Instruction Level Parallelism ("ILP") exploited by the different threads executing at that moment. It is noted that ILP is the ability to execute different instructions from a given thread at the same time. A thread may be monitored, for example, by monitoring, in each interval of time, the number of instructions free of dependencies that cannot be executed because of lack of resources. At the end of the interval, an engine, inside the processor, will monitor a metric for each of the threads (e.g., as each front-end unit executes one thread, the engine will monitor at least one metric for each front-end unit). Alternatively, the engine will compare a measured performance metric to a predetermined value or threshold value. In one embodiment, the threshold value may dynamically vary. That is, in one embodiment, the threshold value used to decide whether a back-end unit 106 assignment is to be changed may dynamically vary. Depending on the metric and its value, the engine may select to remove a back-end unit as a resource in the execution of one thread because, for example, it is not being used, or is only used infrequently. The engine may additionally or alternatively select whether to reassign a removed back-end unit to a second front-end unit (and hence a second thread) or to keep the removed back-end unit idle, switched-off, or otherwise disabled. The removed back-end unit may be reassigned to a second front-end unit because, for example, that second front-end unit needs additional execution resources. The removed back-end unit may be kept idle to save power. It will be noted that additional and/or different criteria may be used to determine whether to reconfigure and/or idle front and back-end units. By way of example, various metrics or criteria may include: global performance (which may be defined as the number of committed instructions per cycle independent of the thread these instructions come from), power, same/different weight to the various threads, etc. Concerning same/different weight to the various threads, those of skill in the art will recognize that instead of global performance, the performance that each thread obtains individually may be measured. Then, threads with low performance could be "penalized" by reducing the number of back-end units 106 they are able to use. One reason for reducing the number of back-end units 106 that a thread may use may be that another thread may be able to use a reassigned back-end unit 106 in a more productive manner. If this technique is used independently of the thread, then all of the threads are assigned the same weight. However, it may be desirable not to penalize a thread with low performance because, for example, the thread must finish as quickly as possible. In that situation, it may not be necessary to reassign the back-end unit 106 the thread is using because it is desirable to execute this thread at a highest possible speed. In such a case, priorities (or weighting factors) may be applied to individual thread performance because, for example, each thread is being treated differently. Of course, the preceding list and examples are meant to be exemplary and are not meant to be limiting.

The reconfiguration process may involve a reassignment of some back-end units 106 to the other front-end units 104. In one embodiment of the invention, the reassignment of some back-end units 106 to the other front-end units 104 may require synchronization among the front-end units 104. A selected new configuration may be broadcast to all front-end units 104. When a back-end unit, e.g., $106_1$, is reassigned from one front-end unit, e.g., $104_1$, to another front-end unit, e.g., $104_2$, at least certain actions may be taken before the another front-end unit, e.g., $104_2$, may be permitted to dispatch instructions to the reassigned back-end unit, e.g., $106_1$.

In one embodiment, an example of the at least certain actions may include an action of completing and committing all pending instructions in the reassigned back-end unit and copying all live registers of this back-end unit (if they are not already replicated in any of the back-end units currently assigned to the thread that was using this back-end unit so far). These register values may be spread across the back-end units currently assigned to the thread. Copying may be performed by, for example, generating a series of copy instructions, which may be pseudo-instructions (not visible at architectural level), that read a register from one cluster and write it into another. The register values to be evicted can be identified by looking them up in a rename table (not shown). However, the rename table information may be incorrect when there is an unresolved mispredicted branch. Those of skill in the art understand that an unresolved mispredicted branch may refer to a branch that has been mispredicted and not yet resolved (i.e., calculated).

To handle the issue of unresolved mispredicted branches, in one embodiment, a stream of copy instructions used to evict values in a back-end unit 106 may conclude with a "special" instruction. The special instruction, however, might be either a new instruction or a special flag in a last copy instruction in the stream of copy instructions. If a flag is set in the last copy instruction, then this flag is preferably set in the last copy instruction of the stream to mark the end of the stream. Thus, in the event of a branch misprediction, whether a special instruction is flushed or a copy instruction with a flag set is flushed, an indication may be provided to identify that a corresponding back-end unit 106 has not yet been evicted. If a flushed special instruction or a flag set in the last generated copy instruction indicates that a corresponding back-end unit 106 has not yet been evicted, then, in one embodiment, the rename table is read again (now with different mappings after the branch recovery) and a new series of copy instructions may be inserted. A back-end unit 106 may be considered empty and all necessary register values correctly evicted when the special instruction is at the head of the reorder buffer ("ROB"). When the special instruction is at the head of the ROB, a notification signal may be sent to a front-end unit 104 so that the front-end unit 104 has an indication that the back-end unit 106 is available. Other methods of ensuring that any back-end unit 106 is empty and all necessary register values are correctly evicted may be used without departing from the scope of the invention.

Clustered multithreaded microarchitecture 101 may be capable of dynamically adapting the resources available to each thread according to the characteristics of a particular workload being run at each moment. In addition, the use of clustering, as illustrated in the embodiments disclosed herein, provides benefit for at least wire delays, power dissipation, and thermal dissipation; reducing each. For example, a microarchitecture using an embodiment of the invention may be able to dynamically switch-off, set to idle, or otherwise disable any back-end unit 106 that the processor 100 is not able to efficiently use. In other words, if the processing demand is such that not every back-end unit 106 is required, then any number of back-end units may be disabled, thus saving power.

In one embodiment of a clustered multithreaded microarchitecture 101, at any moment, a given front-end unit 104 is assigned registers from one or more back-end units 106 and may only make use of those registers to which it has been assigned. Any one front-end unit 104 may be able to identify where its logical registers are mapped because the one or more back-end units 104 assigned to the subject one front-end unit 104 are at its disposal. If, in an embodiment, it happens that a back-end unit 106 may be shared between more than one front-end unit 104, then a first front-end unit must determine what registers all other front-end units are using. Accordingly, if two front-end units share a back-end unit then, communications between all front-end units may be required in order to have the registers of the back-end units correlated.

It should be noted that in embodiments of the invention, communications among front-ends, such as front-ends $104_1$, $104_2, \ldots, 104_n$, are low in quantity because a back-end unit 106 is preferably never used by more than one thread simultaneously. It should also be noted that methods of register communications among back-end units, such as back-end units 106, are known to those of skill in the art and do not, of themselves, form a part of this invention. There are many works in the literature that propose schemes to reduce the impact of these communications. An example of these works includes R. Canal, J. M. Parcerisa, and A. Gonzalez, *Dynamic Cluster Assignment Mechanisms*, Proceedings of the HPCA-6, 2000 and A. Baniasadi and A. Moshovos, *Instruction Distribution Heuristics for Quad-Cluster, Dynamically-Scheduled, Superscalar Processors*, Proceedings of MICRO-33, December 2000.

Figure 2:
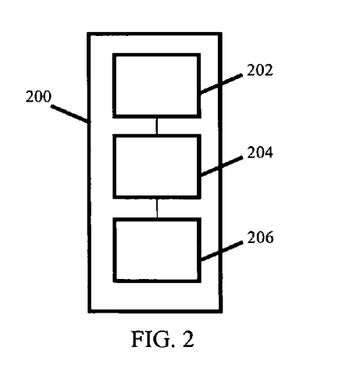
FIG. 2 is a simplified block diagram of a dispatch engine in accordance with an embodiment of the invention.

FIG. 2 is a simplified block diagram of a dispatch engine 200 (similar to dispatch engine(s) $120_1, 120_2, \ldots, 120_n$, FIG. 1) in accordance with an embodiment of the invention. The dispatch engine 200 may include logic for: renaming instructions 202, steering instructions 204, and communicating instructions 206 to a selected back-end unit 106 via the interconnection network 110. Interconnection of the logic 202, 204, and 206 within the dispatch engine 200, and interconnection of the dispatch engine 200 to the physical and functional attributes of a processor, such as processor 100, FIG. 1, are known to those of skill in the art.

Figure 3:
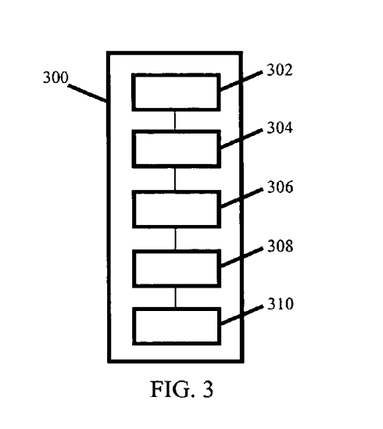
FIG. 3 is a simplified block diagram of a back-end unit in accordance with an embodiment of the invention.

FIG. 3 is a simplified block diagram of a back-end unit 300 (similar to 106 FIG. 1) in accordance with an embodiment of the invention. The back-end unit 300 may include: register file(s) 302, scheduler(s) 304, functional unit(s) 306, data cache(s) 308, and data translation look-aside buffer 310 ("TLB") (also referred to as an address translation cache). Interconnection of the register file(s) 302, scheduler(s) 304, functional unit(s) 306, data cache(s) 308, and TLB 310 within the back-end unit 300, and interconnection of the back-end unit 300 to the physical and functional attributes of a processor, such as processor 100, FIG. 1, are known to those of skill in the art.

Figure 4:
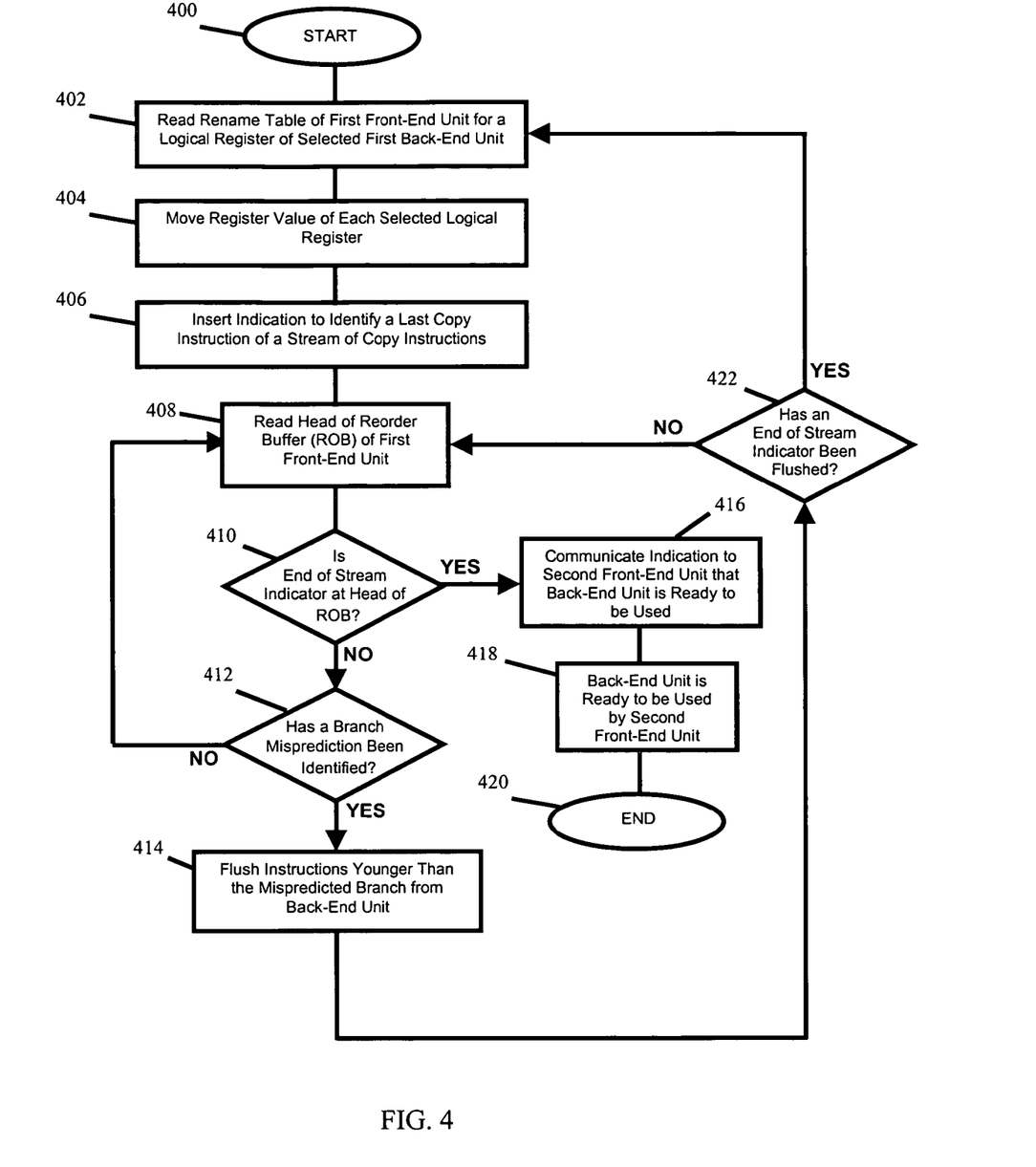
FIG. 4 is a flowchart of an example of a method of back-end unit reassignment according to one embodiment of the invention.

FIG. 4 is a flowchart of an example of a method of back-end unit reassignment according to one embodiment of the invention. Use of subscripted front-end and back-end unit reference numbers is for illustration purposes only and is not intended to limit the invention disclosed herein. When a first back-end unit (e.g., $106_6$) is selected to be reassigned from a first front-end unit (e.g., $104_1$) to a second front-end unit (e.g., $104_2$) at least certain operations may be executed before the first back-end unit $106_6$ can be utilized by the second front-end unit $104_2$. The method begins at 400. At 402, a rename table from the first front-end unit 104, is read and logical registers that are mapped only into the first back-end unit $106_6$ may be selected. At 404, for each selected logical register, a copy instruction micro-operation ("μop") may be inserted into an ROB to move a register value of the selected logical register to a second back-end unit $106_4$ assigned to the first front-end unit $104_1$. At 406, an indication to identify the last copy instruction in a stream of copy instructions may be inserted into the ROB. The indication to identify the last copy instruction in a stream of copy instructions may be, for example, a special instruction or a last inserted copy instruction could be flagged in order to identify the end of the copy stream.

At 408, a head of the reorder buffer of the first front-end unit may be read. At 410, if the special instruction (which may be, for example, an end of stream indicator) is not at the head of the reorder buffer, then the method proceeds to 412. At 410, if the special instruction is at the head of the ROB, then the method proceeds to 416. At 412, a determination is made as to whether a branch misprediction was identified. If a branch misprediction was not identified, then the method returns to 408. Those of skill in the art will understand that a period of at least one clock cycle will elapse between a determination made at 412 and a return to 408. If, at 412, a branch misprediction was identified, then the method proceeds to 414.

At 414, whenever a branch misprediction is found, all the instructions belonging to the same thread that were fetched after the mispredicted branch must be flushed. In other words, all the instructions found in the ROB between a slot used by the mispredicted branch and a tail of the ROB are flushed. Note that special instructions (and the whole stream of copies) that were produced after the mispredicted branch may also be flushed. Moreover, the renaming table information must be restored to the point the mispredicted branch was renamed. At 422, if no special instructions have been flushed, the method may return to 408, where the head of the reorder buffer of the first front-end unit may again be read. If the special instruction is flushed, it means that the generated copies could be moving incorrect values. Therefore, once the renaming table has been restored, the method proceeds to 402 where this table is preferably read again in order to generate the correct stream of copies. By contrast, the copy streams that are older than the mispredicted branch can continue because the renaming information they read is still correct.

At 416, whenever the special instruction μop (or the flagged copy μop) arrives at the head of the ROB (as determined at 410), the correct eviction of the live registers from the back-end unit has occurred. Thus, the back-end unit is empty and, at 416, a notification signal may be communicated to the second front-end unit. This notification signal may notify the second front-end unit that the back-end unit is available for use. At 418, after communication of the notification signal, the second front-end unit may use the back-end unit. At 420, the method may end.

Figure 5:
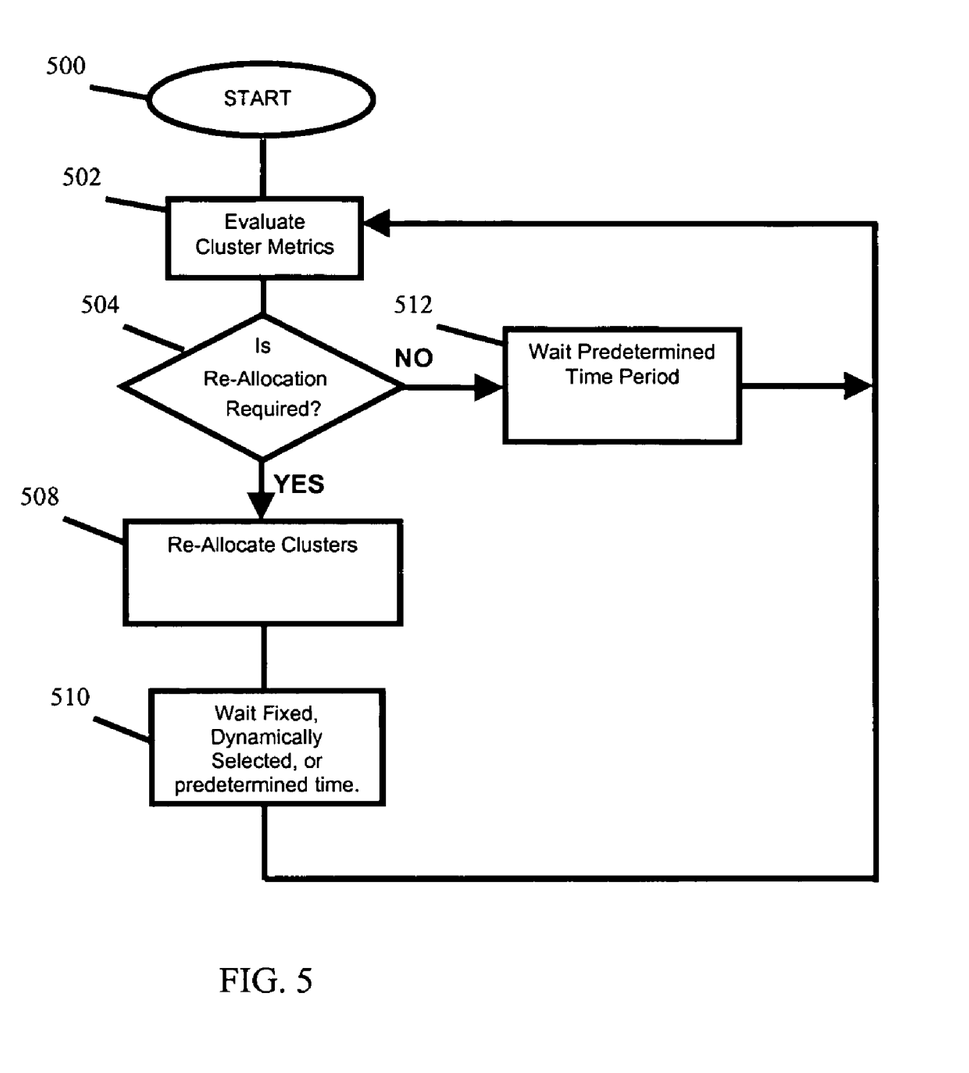
FIG. 5 is a flowchart of an example of a method of dynamically assigning back-end units according to one embodiment of the invention.

FIG. 5 is a flowchart of an example of a method of dynamically assigning back-end units according to one embodiment of the invention. The method begins at 500. At 502, an assignment engine, for example, evaluates at least one predetermined metric concerning the clusters of a multithreaded clustered microarchitecture, such as 101, FIG. 1. If, at 504, the at least one metric indicates, according to a predetermined criteria, that reallocation (also referred to herein as reassignment) is required then, the method proceeds to 508. Otherwise, the method proceeds to 512. At 508 the clusters of the back-end unit (for example the back-end unit 106, FIG. 1) may be reallocated according to the requirements of the threads then undergoing processing. At 510, the method may wait for a predetermined amount of time before returning to 502, where an evaluation of at least one predetermined metric is again conducted. If, at 504, the at least one metric indicates, according to a predetermined criteria, that reallocation is not required, then the method proceeds to 510. At 510, the method may wait for a predetermined amount of time before returning to 502, where an evaluation of at least one predetermined metric is again conducted. Alternatively, at 502, the method may wait until a command is received to return to 502.

Figure 6:
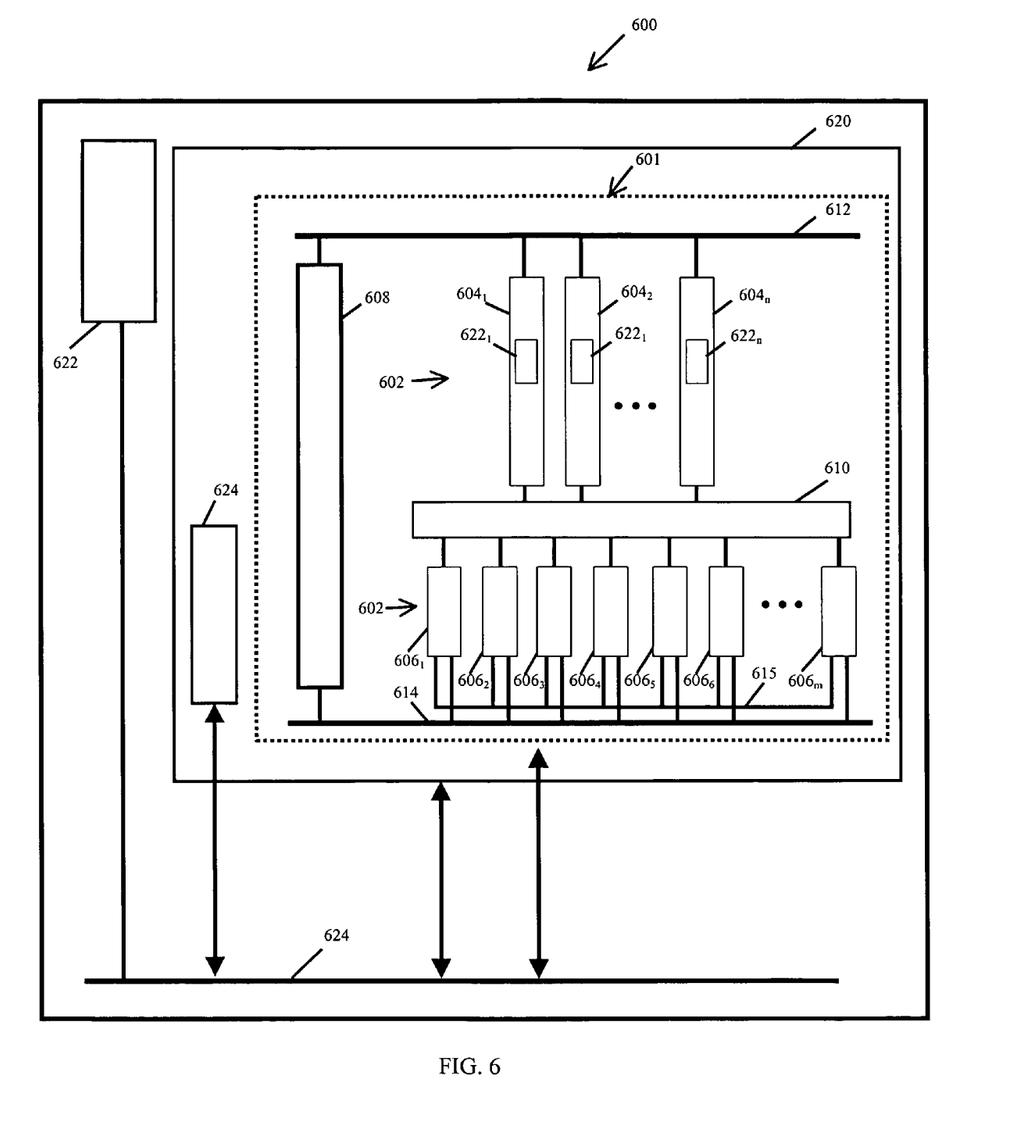
FIG. 6 is a block diagram of a system including a processor including a multithreaded clustered microarchitecture according to one embodiment of the invention.

FIG. 6 is a block diagram of a computer system 600 including a processor 620 including a multithreaded clustered microarchitecture 601 (similar to 101, FIG. 1) as well as an assignment engine 624 (similar to 124, FIG. 1) according to one embodiment of the invention. Computer system 600 includes a system memory 622 such as random access memory (RAM), read only memory (ROM), flash memory, etc., that stores instructions and data from the threads, and a system bus 624 coupled to the system memory 622. Processor 620 includes multithreaded clustered microarchitecture 601, which is coupled to the system bus 624. As already discussed, the multithreaded clustered microarchitecture 601 may include a plurality clusters 602 (similar to 102, FIG. 1). The plurality of clusters 602 may be comprised of a plurality of front-end units $604_1, 604_2, \ldots, 604_n$ (similar to 104, FIG. 1) and a plurality of back-end units $606_1, 606_2, 606_3, 606_4, 606_5, 606_6, \ldots, 606_m$ (similar to 106, FIG. 1). The clusters 602 may be coupled to a memory cache 608. In one embodiment, the memory cache 608 may be a second cache memory level. A interconnection network 610 may couple the front-end units 604 to the back-end units 606. A first bus 612 may couple front-end units 604 to the memory cache 608. A second bus 614 may couple back-end units 606 to the memory cache 608. Back-end units 606 may communicate among themselves via an interconnection network, which may be, in one embodiment, a point-to-point network 615, which may be an orthogonal link that is independent of all other interconnections. While the illustrated computer system 600 may retrieve instructions from system memory 622, the instructions may also be retrieved from any appropriate "on chip" memory such as a trace cache (not shown) or instruction cache $622_1, 622_2, \ldots 622_n$ (similar to $122_1, 122_2, \ldots 122_n$, FIG. 1), etc.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A processing system, comprising:
   a plurality of instruction caches;
   a plurality of front-end units each to process an individual thread from a corresponding one of the plurality of instruction caches;
   a plurality of back-end units;
   an interconnect network coupled to the plurality of front-end units and the plurality of back-end units; and
   an assignment engine to select a first back-end unit assigned to a first front-end unit and reassign the first back-end unit to a second front-end unit.

2. The processing system of claim 1, wherein each of the plurality of front-end units includes one of the plurality of instruction caches.

3. The computer system of claim 2, wherein the included one of the plurality of instruction caches is a dedicated instruction cache of the front-end unit within which it is included.

4. The processing system of claim 1, wherein each of the plurality of instructions caches has one instruction cache port.

5. The processing system of claim 1, wherein a numerical quantity of instruction caches is equal to a numerical quantity front-end units.

6. The processing system of claim 1, wherein each of the plurality of front-end units comprise a fetch stage, a decode stage, and a dispatch stage.

7. The processing system of claim 1, wherein each of the plurality of front-end units further comprise an instruction cache.

8. The processing system of claim 1, wherein each of the plurality of front-end units consists of an instruction cache, a fetch stage, a decode stage, and a dispatch stage.

9. The processing system of claim 1, wherein the plurality of front-end units are interconnected by a first point-to-point network.

10. The processing system of claim 9, wherein the first point-to-point network is an orthogonal network.

11. The processing system of claim 9, wherein the first point-to-point network is independent of the interconnect network.

12. The processing system of claim 1, wherein the plurality of back-end units are interconnected by a second point-to-point network.

13. The processing system of claim 12, wherein the second point-to-point network is an orthogonal network.

14. The processing system of claim 12, wherein the second point-to-point network is independent of the interconnect network.

15. The processing system of claim 1, wherein the interconnect network is one of a crossbar circuit, a pipelined network, and a bus.

16. A method, comprising:
   measuring a performance metric of a back-end unit assigned to a first front-end unit;
   comparing the measured performance metric to a first value;
   reassigning the back-end unit to a second front-end unit if the comparison of the measured performance metric to the first value indicates that reassignment is required; and
   waiting one of a predetermined amount of time and a dynamically selected amount of time before again measuring the performance metric of the back-end unit.

17. The method of claim 16, wherein the measured performance metric includes a measure of the use of a back-end unit.

18. The method of claim 16, wherein the measured performance metric includes a measure of the execution resources of one or more front-end units.

19. The method of claim 16, wherein the measured performance metric includes a measure of global performance.

20. The method of claim 16, wherein the measured performance metric includes a measure of power consumption.

21. The method of claim 16, wherein the measured performance metric includes a measure of same/different weight of execution resources used for a plurality of threads.

22. The method of claim 16, wherein the first value is dynamic.

23. A method, comprising:
 measuring a performance metric of a back-end unit assigned to a first front-end unit;
 comparing the measured performance metric to a first value;
 not reassigning the back-end unit to an available second front-end unit if the comparison of the measured performance metric to the first value indicates that reassignment is not required; and
 waiting one of a predetermined amount of time and a dynamically selected amount of time before again measuring the performance metric of the back-end unit.

24. The method of claim 23, wherein the measured performance metric includes a measure of the use of a back-end unit.

25. The method of claim 23, wherein the measured performance metric includes a measure of the execution resources of one or more front-end units.

26. The method of claim 23, wherein the measured performance metric includes a measure of global performance.

27. The method of claim 23, wherein the measured performance metric includes a measure of power consumption.

28. The method of claim 23, wherein the measured performance metric includes a measure of same/different weight of execution resources used for a plurality of threads.

29. The method of claim 23, wherein the first value is dynamic.

30. A computer system comprising:
 a random access memory to store instructions;
 a system bus coupled to the memory; and
 a processor coupled to the system bus, the processor including:
  a plurality of instruction caches;
  a plurality of front-end units each to process an individual thread from a corresponding one of the plurality of instruction caches;
  a plurality of back-end units;
  an interconnect network coupled to the plurality of front-end units and the plurality of back-end units; and
  an assignment engine to select a first back-end unit assigned to a first front-end unit and reassign the first back-end unit to a second front-end unit.

31. The computer system of claim 30, wherein each of the plurality of front-end units includes one of the plurality of instruction caches.

32. The computer system of claim 31, wherein the included one of the plurality of instruction caches is a dedicated instruction cache of the front-end unit within which it is included.

33. The computer system of claim 30, wherein each of the plurality of instructions caches has one instruction cache port.

34. The computer system of claim 30, wherein a numerical quantity of instruction caches is equal to a numerical quantity front-end units.

35. The computer system of claim 30, wherein each of the plurality of front-end units comprise a fetch stage, a decode stage, and a dispatch stage.

36. The computer system of claim 30, wherein each of the plurality of front-end units further comprise an instruction cache.

37. The computer system of claim 30, wherein each of the plurality of front-end units consists of an instruction cache, a fetch stage, a decode stage, and a dispatch stage.

38. The computer system of claim 30, wherein the plurality of front-end units are interconnected by a first point-to-point network.

39. The computer system of claim 38, wherein the first point-to-point network is an orthogonal network.

40. The computer system of claim 38, wherein the first point-to-point network is independent of the interconnect network.

41. The computer system of claim 30, wherein the plurality of back-end units are interconnected by a second point-to-point network.

42. The computer system of claim 41, wherein the second point-to-point network is an orthogonal network.

43. The computer system of claim 41, wherein the second point-to-point network is independent of the interconnect network.

44. The computer system of claim 30, wherein the interconnect network is one of a crossbar circuit, a pipelined network, and a bus.

45. A processing system, comprising:
 an instruction cache;
 a plurality of front-end units each to process an individual thread from the instruction cache;
 a plurality of back-end units;
 an interconnect network coupled to the plurality of front-end units and the plurality of back-end units; and
 an assignment engine to select a first back-end unit assigned to a first front-end unit and reassign the first back-end unit to a second front-end unit.

46. The processing system of claim 45, wherein the instruction cache is divided into units, each unit assigned to an individual one of the plurality of front-end units.

47. The processing system of claim 45, wherein the one of allocate and reallocate one or more of the plurality of back-end units to one of the plurality of front-end units occurs after a measurement of a performance metric of the one or more of the plurality of back-end units.

\* \* \* \* \*